R. E. ROSEWARNE.
LOCK NUT AND BOLT.
APPLICATION FILED OCT. 4, 1913.
1,128,725.  Patented Feb. 16, 1915.
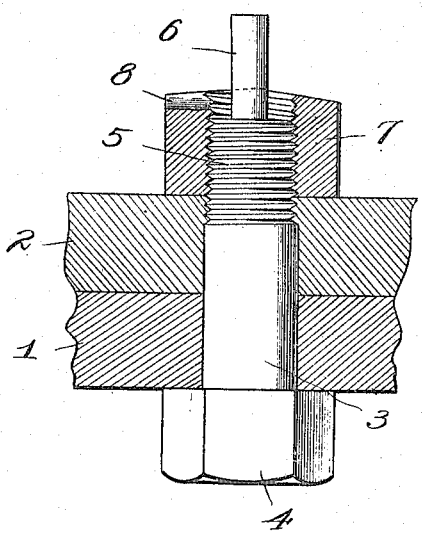
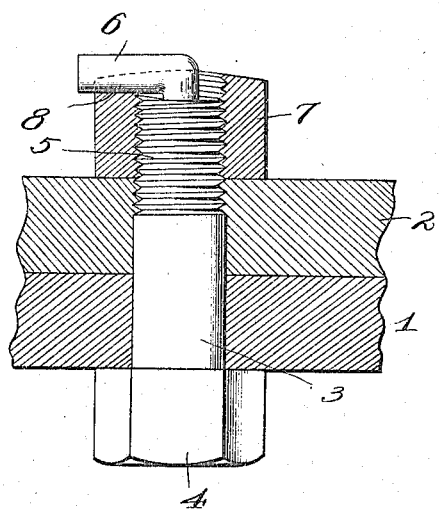
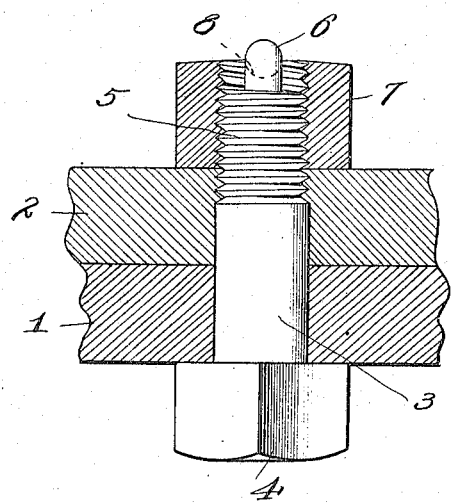
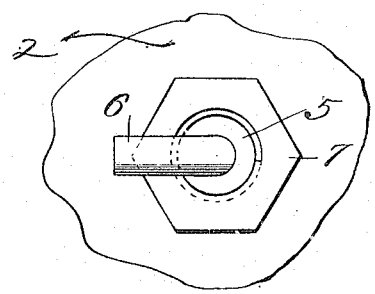

UNITED STATES PATENT OFFICE.

RICHARD E. ROSEWARNE, OF COVINGTON, KENTUCKY.

LOCK NUT AND BOLT.

1,128,725. Specification of Letters Patent. Patented Feb. 16, 1915.

Application filed October 4, 1913. Serial No. 793,440.

*To all whom it may concern:*

Be it known that I, RICHARD E. ROSEWARNE, a citizen of the United States, residing at Covington, in the county of Kenton and State of Kentucky, have invented certain new and useful Improvements in Lock Nuts and Bolts, of which the following is a specification.

This invention relates to that class of interlocking bolts and nuts which involve but two pieces, to wit, a bolt having an integral locking projection carried thereon, and a nut constructed to be engaged by the projection when the latter is deflected into interlocking position. Devices of this kind as heretofore constructed have failed to meet requirements, particularly for railroad use, for two main reasons. First, they have involved objectionable enlargement of the outside dimensions of both the bolt and the nut when in use and the presentation of the locking means in position to receive injury and be displaced from interlocking position. Secondly, they have been such as to render impracticable, the adjustment of the nut after they have once been put into use, without special manipulation of the locking means independently of the adjustment, this manipulation involving both releasing the nut and returning the locking means to a new position relatively to the nut.

The present invention overcomes the objections above noted and provides a two-part interlocking nut and bolt of exceedingly simple construction readily formed by the usual methods of producing bolts and nuts, without involving any material additional step and, therefore, no substantial increase in the cost of production and adapted, when in use, to be adjusted either for tightening or loosening the joint which it holds, and involving no objectionable enlargement of the outside dimensions of the parts when in interlocked position.

In carrying out the invention, the bolt is provided with an integral axial locking pin sufficiently ductile to permit of being bent approximately at right angles to the bolt in order to assume a position radial to the nut to be locked, and of such length that when thus laid over into radial relation to the nut, it has no objectionable projection beyond the perimeter of the nut; this locking pin being of compact section, in the sense that its different diameters are approximately equal, so that it is torsionally flexible without displacing the radially bent portion from its locking position. And the nut is provided with a radial groove upon its outer face, into which the locking pin may be laid when it is bent over into locking position. There is a distinct advantage arising from this organization of parts and structural condition of the parts over means heretofore provided for interlocking a nut with its bolt by means of a radially disposed pin, in addition to the manufacturing advantages already mentioned and chief among these is the fact that the compact section of the ductile locking pin admits of torsional flexibility, from which it follows that while the presence of the locking pin in the face groove of the nut will prevent unintentional turning of the nut under the vibratory forces that develop in the use of the device, the nut may nevertheless be turned in either direction by the application of a suitable wrench, and when so turned, the swinging of the radial portion of the locking pin in the plane of the outer face of the nut, and about the axis of the bolt as a center, is permitted to take place with the turning of the nut, because the compact section of the pin permits its radial portion to swing about the longitudinal axis in response to the torsional bending of the pin which must take place adjacent to the bolt in consequence of the constantly changing radial position of the locking pin. Any slight axial foreshortening of the pin due to twisting of its axial portion will only tend to press the radial portion more firmly into the locking groove. Hence the nut can be rotated within limits (at least a half revolution) after the locking pin is bent into position, without breaking the pin, and it thus becomes possible to tighten or loosen a nut locked by the present invention. This is advantageous not only because it frequently becomes necessary to take up looseness due to stretching in the bolt or wear between the abutting faces of the parts, but it renders the application of the locking device more convenient because avoiding necessity for the same degree of accuracy in bending over the pin as would be required where the bolt is first turned to a position from which it cannot be moved without breaking the locking pin.

In the drawing:—Figure 1 is a detail sectional view of a rail and fish plate with my improved fastening in position, parts being in elevation; Fig. 2 is a view similar to Fig.

1 showing the nut locked to the bolt; Fig. 3 is a view similar to Fig. 2 showing a different relative position of the nut on the bolt; Fig. 4 is a top plan view of the bolt and nut.

The reference numeral 1 designates a rail and 2 the fish plate which may be of any suitable construction.

3 is the bolt having a head 4, a threaded portion 5 and a reduced locking pin 6 of circular section projecting axially therefrom and having a length adapted to reach radially across the nut when the pin is bent into locking position. This reduced portion 6 is of a diameter materially less than the diameter of the body portion of the bolt and is integral with the bolt and adapted to be bent over in the position shown in Figs. 2, 3, and 4 to engage in a recess in the nut 7 whereby the nut and bolt are interlocked. The nut 7 is provided with a single radial recess or notch 8 into which, as above stated, the reduced end portion 6 may be bent to interlock the bolt and nut.

Inasmuch as the reduced end portion 6 is integral with the bolt and extends in the direction of the length of the bolt, it can be bent into the recess 8 of the nut irrespective of the angular position (relative to the bolt) of the recess after the nut has been screwed firmly into place.

As will be seen from Fig. 3 the reduced extended end 6 may be bent to engage the recess 8 in the nut irrespective of the position of the nut on the bolt; that is to say, it frequently happens that the threaded portion of a bolt cannot extend entirely through the nut but with my improved integral locking portion 6 this does not make any difference because the extended end 6 may be bent to engage the recess 8 in the nut.

Of course it will be understood that while I have selected, for the purposes of illustration, a railroad joint, my invention is not restricted in use to rail joints but is equally efficient in all structural work.

Of course it is obvious that I may omit the notch in the nut without impairing the efficiency of my improved lock.

I claim:—

An interlocking bolt and nut; the bolt having a relatively short locking pin projecting axially from the bolt and adapted to be bent into position radially to the outer face of the nut; the nut having a radial groove adapted to receive the locking pin when bent into said radial position; and the locking pin having a compact section and being torsionally flexible, whereby when bent into interlocked relation, its radial portion will swing with the nut, when the nut is rotated relatively to the bolt by the application of suitable force to the nut.

The foregoing specification signed at Cincinnati, Ohio, this thirteenth day of September, 1913.

RICHARD E. ROSEWARNE.

Witnesses:
C. F. ABELL,
E. G. RIETMAN.